W. J. SZCZEPANIAK.
STEERING WHEEL LOCK FOR AUTOMOBILES.
APPLICATION FILED JUNE 22, 1922.
1,438,068.  Patented Dec. 5, 1922.
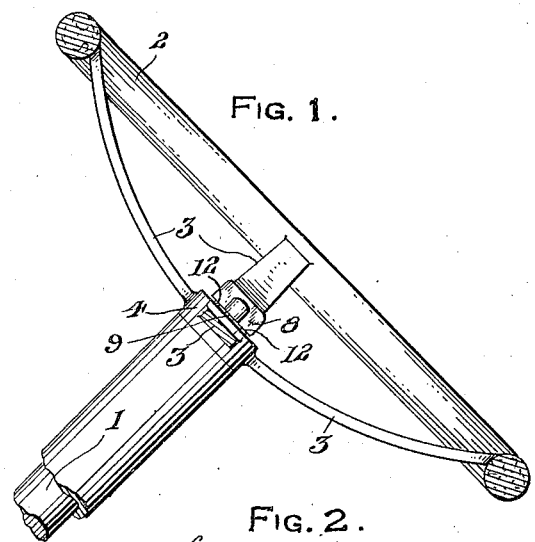
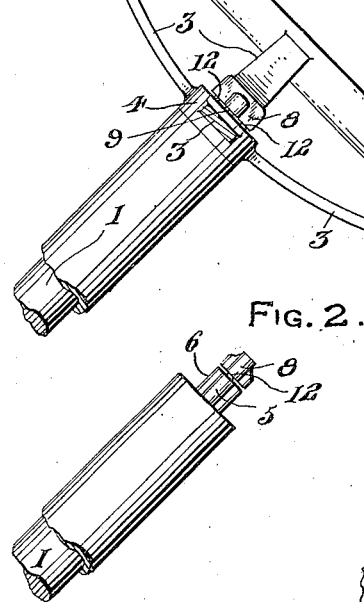
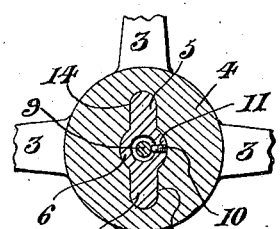
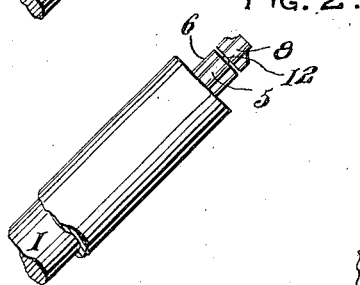
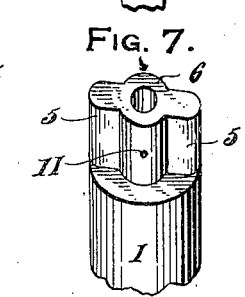
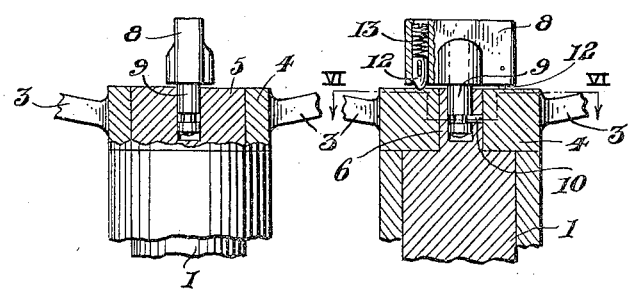
Inventor
W. J. Szczepaniak
By J. K. Bryant
Attorney Patented Dec. 5, 1922.

1,438,068

UNITED STATES PATENT OFFICE.

WALTER J. SZCZEPANIAK, OF MARCHE, ARKANSAS.

STEERING-WHEEL LOCK FOR AUTOMOBILES.

Application filed June 22, 1922. Serial No. 570,130.

*To all whom it may concern:*

Be it known that I, WALTER J. SZCZE-PANIAK, a citizen of the United States of America, residing at Marche, in the county of Pulaski and State of Arkansas, have invented certain new and useful Improvements in Steering-Wheel Locks for Automobiles, of which the following is a specification.

This invention relates to certain new and useful improvements in steering wheel locks for automobiles and has particular reference to the provision of a removable steering wheel adapted for disengagement from the post whereby the operation of the automobile will be impossible.

The primary object of the present invention embodies a steering wheel having detachable interlocking engagement with the upper end of a steering post with a turn button associated therewith for locking the steering wheel to the post when the same is in its operative position.

With these general objects in view and others that will appear as the nature of the invention is better understood the same consists in the novel construction, combination and arrangement of parts hereinafter more fully described, illustrated in the accompanying drawing, and pointed out in the appended claims.

In the drawings forming a part of the application and in which like designating characters refer to corresponding parts throughout the several views:

Figure 1 is a fragmentary side elevational view of the upper end of a steering post for an automobile showing the steering wheel in section, Figure 2 is a fragmentary side elevational view similar to Figure 1 showing the steering wheels removed from the post, Figure 3 is a detail sectional view taken on line III—III of Figure 4, Figure 4 is a fragmentary top plan view of the steering post and wheel showing the turn button shifted to its locked position for retaining the steering wheel upon the post, Figure 5 is a detail sectional view taken on line V—V of Figure 4 showing the swivel connection for the turn button and the spring pressed finger for retaining the turn button in its adjusted position, Figure 6 is a detail sectional view taken on line VI—VI of Figure 5 showing the interlocking connection between the steering wheel and post, and Figure 7 is a fragmentary perspective view of the upper end of the steering post.

Referring more in detail to the accompanying drawing, the reference numeral 1 designates the steering post of an automobile to the upper end of which the steering wheel embodying a ring 2 and a spider frame 3 having a central hub 4 is removably secured.

The upper end of the steering post 1 is shown more clearly in Figures 2, 6 and 7, the same being cut away to provide a transverse bar 5 having a cylindrical enlargement 6 intermediate the ends thereof with a central bore 7 as illustrated. A locking button 8 of a configuration similar to the bar 5 carries a depending stem 9 received in the bore 7 as shown in Figures 3 and 5, the stem 9 being provided with an annular groove that receives a screw pin 10 passing through the opening 11 in one side wall of the cylindrical portion 6 of the bar 5 as shown in Figures 6 and 7 to enter the annular grooves for swivelly retaining the button 8 upon the upper end of the bar 5. Each end of the bar 5 is provided with a perpendicular bore receiving a pin 12 that is spring pressed as at 13 for engaging the hub 4 of the steering wheel as shown in Figure 5 for retaining the button in its locked position.

The hub 4 of the steering wheel is provided with an opening 14 extending perpendicularly therethrough and of a configuration similar to a button 8 and the bar 5, the hub 4 of the steering wheel passing over the button 8 and being received upon the bar 5 of the steering post for interlocking engagement therewith, rotary movement of the steering wheel affecting rotation of the post 1. When the hub 4 of the steering wheel is so positioned, the button 8 is then turned as illustrated in Figure 4 with the spring pressed fingers 12 carried by the ends thereof engaging the upper wall of the steering wheel hub for securely locking the wheel to the post. The steering wheel is removed from the post 1 by rotating the button 8 to dispose the same in alignment with the bar 5, at which time the wheel is easily removed and may be placed in a lock box or other compartment carried by the automobile.

While the form of the invention herein shown and described, is what is believed to be the preferred embodiment thereof, it is nevertheless to be understood that various forms, modifications and arrangements of the parts may be made without departing from the spirit and scope of the invention as claimed.

Having thus described the invention, what I claim as new is:—

1. In a removable wheel for the steering post of an automobile, the combination with a post having a bar projection at the upper end thereof, a locking turn button rotatably supported upon said bar projection and a steering wheel having a hub with an opening therein of a configuration similar to said bar and turn button with the hub positioned upon said bar for interlocking engagement therewith beneath the button.

2. In a removable wheel for the steering post of an automobile, the combination with a post having a bar projection at the upper end thereof, a locking turn button rotatably supported upon said bar projection and a steering wheel having a hub with an opening therein of a configuration similar to said bar and turn button with the hub positioned upon said bar for interlocking engagement therewith beneath the button, and spring pressed fingers carried by said button adapted for engagement with the hub of the wheel for holding the button in a crossed locked position relative to the post projection.

In testimony whereof I affix my signature.

WALTER J. SZCZEPANIAK.